United States Patent Office 3,161,660
Patented Dec. 15, 1964

3,161,660
2α-LOWER-ALKYL-9α-HALO-11,17-DIOXYGEN-ATED-3-KETO-4-ANDROSTENES
John A. Hogg, Charleston Township, Kalamazoo County, and William P. Schneider, Kalamazoo Township, Kalamazoo County, Mich., assignors to The Upjohn Company, Kalamazoo, Mich., a corporation of Delaware
No Drawing. Filed July 12, 1960, Ser. No. 42,206
6 Claims. (Cl. 260—397.3)

This application is a continuation-in-part of our parent application Serial No. 547,314, filed November 16, 1955, now abandoned.

The present invention relates to novel steroid compounds and is more particularly concerned with 2α-lower-alkyl-9α-halo-11,17-dioxygenated-3-keto-4-androstenes, intermediates therefor and a process for the preparation thereof.

The novel compounds of the present invention may be represented by the following sequence of formulae:

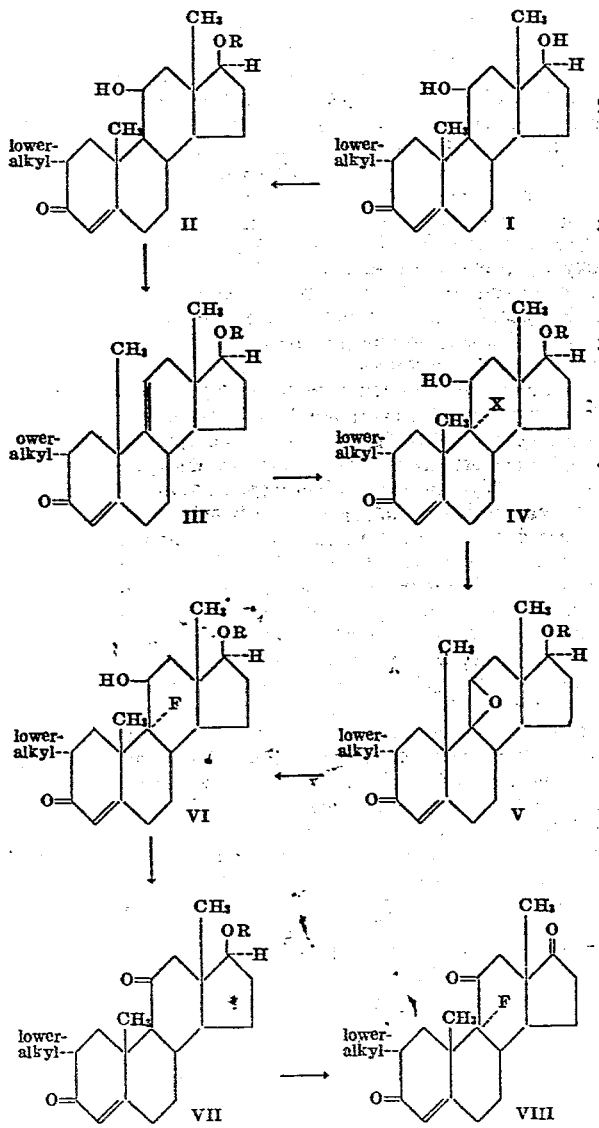

wherein the lower-alkyl group contains from one to eight carbon atoms, inclusive, R is selected from the group consisting of hydrogen and acyl in which the acyl radical is of an organic carboxylic acid, preferably a hydrocarbon carboxylic acid containing from one to eight carbon atoms, inclusive, and X is a halogen of atomic weight 34 thru 130.

The process of the instant invention comprises: treating 2α-lower-alkyl-11β,17β-dihydroxy-4-androsten-3-one (I) with an acylating agent selected from halides and anhydrides of organic carboxylic acids, preferably hydrocarbon carboxylic acids containing from one to eight carbon atoms, inclusive, to obtain the corresponding 2α-lower-alkyl-11β-hydroxy-17β-acyloxy - 4 - androsten-3-one (II); treating the thus produced 2α-lower-alkyl-11β-hydroxy-17β-acyloxy-4-androsten-3-one with an N-halo acyl amide in an organic base to give a 2α-lower-alkyl-11β-hypohalite-17β-acyloxy-4-androsten-3-one and treating this intermediate with sulfur dioxide under anhydrous conditions to obtain the corresponding 2α-lower-alkyl-17β-acyloxy-4,9(11)-androstadien-3-one (III); treating the thus produced 2α-lower-alkyl-17β-acyloxy-4,9(11)-androstadien-3-one with a hypohalous acid to obtain the corresponding 2α-lower-alkyl-9α-halo-11β-hydroxy - 17β-acyloxy-4-androsten-3-one (IV) wherein the halo is of atomic weight 34 to 130; heating the thus obtained 2α-lower-alkyl-9α-halo-11β-hydroxy-17β-acyloxy - 4 - androsten-3-one with an anhydrous alkali metal acetate, such as potassium or sodium acetate to obtain the corresponding 2α-lower-alkyl-9,11β-oxido-17β-acyloxy-4-androsten-3-one (V); treating the thus obtained 2α-lower-alkyl-9,11β-oxido-17β-acyloxy-4-androsten-3-one with hydrogen fluoride to obtain the corresponding 2α-lower-alkyl-9α-fluoro-11β-hydroxy-17β-acyloxy-4-androsten - 3 - one (VI) and oxidizing the thus produced 2α-lower-alkyl-9α-fluoro-11β-hydroxy-17β-acyloxy-4-androsten-3-one with chromic acid to obtain the 2α-lower-alkyl-9α-fluoro-17β-acyloxy-4-androstene-3,11-dione (VII); hydrolyzing with a base 2α-lower-alkyl-9α-fluoro-17β-acyloxy - 4 - androstene-3,11-dione to give the 2α-lower-alkyl-9α-fluoro - 17β - hydroxy-4-androstene-3,11-dione and oxidizing 2α-lower-alkyl-9α-fluoro-17β-hydroxy-4-androstene-3,11-dione with chromic acid to give 2α-lower-alkyl-9α-fluoro-4-androstene-3,11,17-trione (VIII).

The starting materials of Formula I of the flow-sheet in column 1 are prepared in the manner disclosed in abandoned parent application Serial No. 547,314; namely, by reduction of a 2α-lower-alkyl-11β-hydroxy-4-androstene-3,17-dione, preferably with an alkali metal borohydride, to produce a mixture of a corresponding 2α - lower-alkyl-11β,17β-dihydroxy-4-androsten-3-one (I) and a corresponding 2α-lower-alkyl-3β,11β,17β-trihydroxy-4-androstene; oxidation of this mixture, preferably with manganese dioxide, yields a corresponding 2α-lower-alkyl - 11β,17β - dihydroxy - 4 - androsten - 3 - one (I), exclusively.

The instantly produced compounds, 2α-lower-alkyl-9α-halo-11β-hydroxy - 4 - androstene-3,17-dione, 2α-lower alkyl-9α-halo-11β-hydroxy-testosterones, 2α-lower-alkyl-9α-halo-11-ketotestosterones, 2α-lower-alkyl-9α-halo-adrenosterone, and the esters of these compounds are important physiologically active compounds, having strong androgenic, anabolic, antiestrogenic, and adrenocortical activity and are useful in formulations in place of cortisone. The compounds in addition have anti-inflammatory, antipituitary, and anesthetic activity. 2α-lower-alkyl-9α-halo-adrenosterone, can be reacted with a methyl magnesium halide to give the corresponding 2-lower-alkyl-9α-halo-17α-methyl-17β-hydroxy-4-androstene-3,11-dione.

In order to obtain the 9α-halo compounds of this invention a 2α - lower-alkyl-11β-hydroxy-17β-acyloxy-4-androstene-3-one is dehydrated to the corresponding 2α-lower-alkyl-17β-acyloxy-3,9(11)-androstadiene-3-one. Dehydrating agents suitable are, for example, phosphorous oxychloride, hydrochloric acid, or sulfuric acid in acetic acid or pyrolysis as shown by U.S. Patents 2,640,838 and 2,640,839. In the preferred embodiment of the present invention the dehydration is effected by reacting the 11β-hydroxy compound with N-haloamide or N-haloimide in an organic base and treating the thus produced intermediate 11-hypohalite with dry sulfur dioxide. As reagents for the production of an 11-hypohalite, N-haloamide or N-haloimide wherein the halogen has an atomic weight from 34 to 130, inclusive, preferably chlorine or bromine, are used. Examples of such compounds are N-chloroacetamide, N-bromoacetamide, N-chlorosuccinimide, N-bromosuccinimide, N-iodosuccinimide, 3-bromo-5,5-dimethylhydantoin and 1,3-dibromo-5,5-dimethylhydantoin. Ordinarily an amount in excess of a molar equivalent, calculated on the starting 11β-hydroxy steroid, is employed. The bases employed in the production of the 11-hypohalite are tertiary amines with the amino nitrogen as a member of an aromatic ring, for example, the pyridines, that is, pyridine, alkyl pyridines, piccoline, lutidine, collidine, conyrine, parvuline, or the like or lower fatty amides, such as formamide, methylformamide and dimethylformamide. The base is preferably employed in a large molar excess, calculated on the starting 11β-hydroxy steroid, for example, ten molar equivalents, and is preferably the sole reaction solvent. The reaction to produce an 11-hypohalite is generally conducted under anhydrous conditions preferably containing less than 0.1 molar equivalent of water calculated per mole of steroid. Large proportions of water decrease the yield. The temperature of the reaction is between minus forty and plus seventy degrees centigrade, the lower limit being determined by the solubility of the reaction and solvents and the upper limit being determined by the amount of side reaction which normally accompanies the reaction involving halo compounds at higher temperatures. Ordinarily, room temperature (twenty to thirty degrees centigrade) is preferred for convenience and consistently high yields of the desired product which are obtained at this temperature. A reaction period between five minutes to three hours is usually employed. At a higher temperature, above thirty degrees centigrade, short reaction times are sufficient to produce completeness of the reaction.

The thus produced 2α-lower-alkyl-11β-hydroxy-17β-acyloxy-4-androsten-3-one 11β-hypohalite is then treated with anhydrous sulfur dioxide in the presence of an organic base as described hereinbefore. The anhydrous sulfur dioxide can be in the form of gaseous, or liquid sulfur dioxide. The reaction temperature ranges substantially within about minus forty and about plus seventy degrees centigrade and preferably room temperature (twenty to thirty degrees centigrade). The thus obtained product, a 2α-lower-alkyl-17β-acyloxy-4,9(11)-androstadien-3-one is isolated by conventional means such as extraction from the reaction mixture after the reaction mixture has been poured into excess of water. The thus obtained extracts are conveniently washed, dried and thereupon evaporated to give the crude 2α-lower-alkyl-17β-acyloxy-4,9(11)-androstadiene-3-one which is purified by conventional means such as recrystallization or chromatography, as deemed necessary. The thus obtained 2α-lower-alkyl-17β-acyloxy-4,9(11)-androstadien-3-one is converted to 2α-lower-alkyl-9α-halo-11β-hydroxy-17α-acyloxy-4-androsten-3-one thereof by adding a hypohalous acid such as hypochlorous or hypobromous acid. The hypohalous acid can be added in aqueous alcoholic solution, but it usually produced in situ by reacting an N-halo acid amide or an N-halo acid imide with an acid to liberate hypohalous acid. In the preferred embodiment of the invention, a 2α-lower-alkyl-17β-acyloxy-4,9(11)-androstadiene-3-one is dissolved in an organic solvent such as methylene chloride, tertiary butyl alcohol, dioxane, tertiary amyl alcohol, or the like and reacted at room temperature with the hypobromous, hypochlorous, or hypoiodous acid releasing agent. Such hypohalous acid releasing agents include the N-bromoacetamide, the N-chloroacetamide, the N-bromosuccinimide, the N-iodosuccinimide, or the like in the presence of water and an acid such as perchloric acid, dilute sulfuric acid, or the like. The reaction is usually carried out at room temperature between fifteen to thirty degrees centigrade, however, lower or higher temperatures are operative for the process. The hypohalous acid releasing agent is generally used in equimolar or slightly increased proportions, for example, 25 percent increase over the theoretical. A large excess of the hypohalous acid releasing agent while operative is undesirable since the excess hypohalous acid has a tendency to act on other positions of the molecule. The reaction period is rather short and may vary between four to five minutes to one hour. At the end of the reaction time, excess of hypohalous acid is destroyed by the addition of sodium sulfite or other sulfites or hydrosulfites. The thus produced product, a 2α-lower-alkyl-9α-halo-11β-hydroxy-17β-acyloxy-4-androsten-3-one, wherein halo is of atomic weight between 34 and 130, is isolated from the reaction mixture by adding excess of water and extracting the compound with organic solvents or by recovering the precipitated compound through filtration. The crude product thus obtained may be recrystallized from acetone and Skellysolve B hexane hydrocarbons to give pure 2α-lower-alkyl-9α-halo-11β-hydroxy-17α-acyloxy-4-androsten-3-ones, respectively, the corresponding esters thereof.

The 17β-ester thus obtained is hydrolyzed to give the free diol, 2α-lower-alkyl-9α-halo-11β,17β-dihydroxy-4-androsten-3-one, which can be reesterified with anhydrides or halides of organic carboxylic acids, preferably hydrocarbon carboxylic acids, to give other monoesters.

Oxidizing the 17-ester of a 2α-lower-alkyl-9α-halo-11β,17β-dihydroxy-4-androsten-3-one with chromic acid produces the corresponding 2α-lower-alkyl-9α-halo-17β-acyloxy-4-androstene-3,11-dione which by hydrolysis, as shown before, gives the free diol, 2α-lower-alkyl-9α-halo-17β-hydroxy-4-androstene-3,11-dione.

Further oxidation of 2α-lower-alkyl-9α-halo-17β-hydroxy-4-androstene-3,11-dione produces the corresponding 2α-lower-alkyl-9α-halo-4-androstene-3,11,17-trione (2-lower-alkyl-9α-halo-adrenosterone).

In order to obtain the most active 9α-fluoro-compounds, the 9,11β-oxido intermediates of the before mentioned compounds, 2α-lower-alkyl-9β,11β-oxido-17β-acyloxy-4-androsten-3-one are prepared. In carrying out this reaction, a 2α-lower-alkyl-9α-halo-11β-hydroxy-17β-acyloxy-4-androsten-3-one is heated in solution with anhydrous sodium or potassium acetate. Solvents such as methanol, ethanol, acetone, tertiary butyl alcohol, or the like may be used. The reaction time is between one-half hour and 24 hours with a period between three and twelve hours generally sufficient. The thus obtained 2α-lower-alkyl-9β,11β-oxido-17β-acyloxy-4-androsten-3-one is isolated from the reaction mixture by pouring the reaction mixture into excess water and extracting with methylene chloride or other water-immiscible solvents such as ether, Skellysolve B hexanes, pentanes, benzene, ethyl acetate, chloroform, carbon tetrachloride, or the like. Evaporation of the solvent of the extracts produces crude 2α-lower-alkyl-9β,11β-oxido-17β-acetoxy-4-androsten-3-one.

The thus obtained 2α-lower-alkyl-9β,11β-oxido-17β-acyloxy-4-androsten-3-one is thereupon reacted with hydrofluoric acid, usually in 48 percent concentration. As solvents for this reaction, methylene chloride, ethylene dichloride, chloroform, carbon tetrachloride, or the like, are useful, with methylene chloride preferred. Sometimes strong acid catalysts are employed such as perchloric acid, toluenesulfonic acid, sulfuric acid, or the like. The reaction is carried out at room temperature preferably under stirring. The reaction period is from one to 24 hours with a period from one to twelve hours preferred. After the reaction is terminated, the mixture is poured into water and neutralized with a dilute base such as sodium bicarbonate, potassium bicarbonate, or the like. Excess of strong bases can also be used, however, hydrolysis of ester groups is then expected. The reaction mixture is thereafter extracted with a water-immiscible solvent such as methylene chloride and the extracts evaporated to give the crude 2α-lower-alkyl-9α-fluoro-11β-hydroxy-17β-acyloxy-4-androsten-3-one. The thus obtained crude compounds may be purified through recrystallization or chromatography as deemed necessary.

The 2α-lower-alkyl-9α-fluoro-11β-hydroxy-17β-acyloxy-4-androstene-3-one obtained by this process can be hydrolyzed with a base such as sodium hydroxide, potassium hydroxide, sodium or potassium carbonate to give the diol, 2α-lower-alkyl-9α-fluoro-11β,17β-dihydroxy-4-androsten-3-one.

Oxidation of the 2α-lower-alkyl-9α-fluoro-11β-hydroxy-17β-acyloxy-4-androsten-3-one with chromic acid in acidic acid produces the corresponding 2α-lower-alkyl-9α-fluoro-17β-acyloxy-4-androstene-3,11-dione which can be hydrolyzed with sodium bicarbonate in ethanol in a nitrogen atmosphere to give the free alcohol, 2α-lower-alkyl-9α-fluoro-17β-hydroxy-4-androstene-3,11-dione.

Oxidation of 2α-lower-alkyl-9α-fluoro-17β-hydroxy-4-androstene-3,11-dione with chromic acid in acetic acid produces the corresponding 2α-lower-alkyl-9α-fluoro-4-androstene-3,11,17-trione (2α-lower-alkyl-9α-fluoro adrenosterone).

The following examples are illustrative of the process and products of the present invention but are not to be construed as limiting.

EXAMPLE 1

*2α-Methyl-11β-Hydroxy-17β-Acetoxy-4-Androsten-3-One*

0.5 gram of 2α-methyl-11β,17β-dihydroxy-4-androstene-3-one, dissolved in three milliliters of acetic anhydride and three milliliters of pyridine was maintained at room temperature for a period of eighteen hours. Thereupon the reaction mixture was poured into excess of ice water and the thus obtained precipitate collected on filter paper and recrystallized to give pure 2α-methyl-11β-hydroxy-17β-acetoxy-4-androsten-3-one.

EXAMPLE 2

*2α-Ethyl-11β-Hydroxy-17β-Benzoyloxy-4-Androsten-3-One*

In the same manner as given in Example 1, 2α-ethyl-11β,17β-dihydroxy-4-androsten-3-one, dissolved in pyridine, was treated with benzoyl chloride to give 2α-ethyl-11β-hydroxy-17β-benzoyloxy-4-androsten-3-one.

EXAMPLE 3

In the same manner as given in Examples 1 and 2, reacting in pyridine solution:

(a) 2α-methyl-11β,17β-dihydroxy-4-androsten-3-one with propionic anhydride yielded 2α-methyl-11β-hydroxy-17β-propionyloxy-4-androsten-3-one.

(b) 2α-methyl-11β,17β-dihydroxy-4-androsten-3-one with butyric anhydride yielded 2α-methyl-11β-hydroxy-17β-butyryloxy-4-androsten-3-one.

(c) 2α-methyl-11β,17β-dihydroxy-4-androsten-3-one with valeric anhydride yielded 2α-methyl-11β-hydroxy-17β-valeryloxy-4-androsten-3-one.

(d) 2α-methyl-11β,17β-dihydroxy-4-androsten-3-one with β-cyclopentylpropionyl bromide yielded 2α-methyl-11β-hydroxy-17β-(β-cyclopentylpropionyloxy)-4-androsten-3-one.

(e) 2α-methyl-11β,17β-dihydroxy-4-androsten-3-one with 2-furoyl chloride yielded 2α-methyl-11β-hydroxy-17β-(2-furoyloxy)-4-androsten-3-one.

(f) 2α-ethyl-11β,17β-dihydroxy-4-androsten-3-one with propionic anhydride yielded 2α-ethyl-11β-hydroxy-17β-propionyloxy-4-androsten-3-one.

(g) 2α-propyl-11β,17β-dihydroxy-4-androsten-3-one with hexanoyl bromide yielded 2α-propyl-11β-hydroxy-17β-hexanoyloxy-4-androsten-3-one.

(h) 2α-butyl-11β,17β-dihydroxy-4-androsten-3-one with toluyl bromide yielded 2α-butyl-11β-hydroxy-17β-toluyloxy-4-androsten-3-one.

(i) 2α-hexyl-11β,17β-dihydroxy-4-androsten-3-one with phenylacetyl bromide yielded 2α-hexyl-11β-hydroxy-17β-phenylacetoxy-4-androsten-3-one.

(j) 2α-octyl-11β,17β-dihydroxy-4-androsten-3-one with phenylpropionyl chloride yielded 2α-octyl-11β-hydroxy-17β-phenylpropionyloxy-4-androsten-3-one.

(k) 2α-benzyl-11β,17β-dihydroxy-4-androsten-3-one with octanoyl bromide yielded 2α-benzyl-11β-hydroxy-17β-octanoyloxy-4-androsten-3-one.

In the same manner as given in Examples 1 and 3, other 2α-lower-alkyl-11β-hydroxy-17β-acyloxy-4-androsten-3-ones are prepared by reacting the corresponding 2α-lower-alkyl-11β,17β-dihydroxy-4-androsten-3-ones with a halide or anhydride of an organic carboxylic acid, preferably a hydrocarbon carboxylic acid containing from one to eigth carbon atoms. Representative 2α-lower-alkyl-11β-hydroxy-17β-acyloxy-4-androsten-3-ones include those wherein the lower-alkyl group is methyl, ethyl, propyl, isopropyl, butyl, isobutyl, pentyl, hexyl, heptyl, octyl, phenyl, benzyl, or the like, and wherein the acyloxy group is formyloxy, acetoxy, propionyloxy, butyryloxy, isobutyryloxy, valeryloxy, isovaleryloxy, hexanoyloxy, heptanoyloxy, octanoyloxy, benzoyloxy acid, succinyloxy, acid tartaryloxy, chloroacetoxy, iodoacetoxy, fluoroacetoxy, bromoacetoxy, trichloroacetoxy, trifluoroacetoxy, chlorobenzoyloxy, phenylacetoxy, phenylpropionyloxy, meta-, para-, and also nitro-benzoyloxy, or the like.

EXAMPLE 4

*2α-Methyl-17β-Acetoxy-4,9(11)-Androstadiene-3-one*

The 2α-methyl-11β-hydroxy-17β-acetoxy-4-androsten-3-one obtained in Example 1, was dissolved in pyridine. Thereto was added one molar equivalent of N-bromoacetamide under continuous stirring. After thirty minutes of stirring anhydrous sulfur dioxide was passed through the flask until a negative test was obtained with starch iodide paper. The reaction mixture was thereupon diluted with water and extracted with methylene chloride. The methylene chloride extracts were evaporated to give 2α-methyl-17β-acetoxy-4,9(11)-androstadien-3-one.

EXAMPLE 5

*2α-Ethyl-17β-Acetoxy-4,9(11)-Androstadien-3-one*

In the same manner as shown in Example 4, treating 2α-ethyl-11β-hydroxy-17β-acetoxy-4-androsten-3-one with N-chlorosuccinimide in pyridine solution and thereafter with anhydrous sulfur dioxide gave 2α-ethyl-17β-acetoxy-4,9(11)-androstadien-3-one.

EXAMPLE 6

In the same manner as given in Example 4, reacting in pyridine solution:

(a) 2α-methyl-11β-hydroxy-17β-propionyloxy-4-androsten-3-one with N-bromosuccinimide and thereafter with anhydrous sulfur dioxide yielded 2α-methyl-17β-propionyloxy-4,9(11)-androstadien-3-one.

(b) 2α-methyl-11β-hydroxy-17β-butyryloxy-4-androsten-3-one with N-bromosuccinimide and thereafter with anhydrous sulfur dioxide yielded 2α-methyl-17β-butyryloxy-4,9(11)-androstadien-3-one.

(c) 2α-methyl-11β-hydroxy-17β-valeryloxy-4-androsten-3-one with N-bromosuccinimide and thereafter with anhydrous sulfur dioxide yielded 2α-methyl-17β-valeryloxy-4,9(11)-androstadien-3-one.

(d) 2α-methyl-11β-hydroxy-17β-(β-cyclopentyl-propionyloxy)-4-androsten-3-one with N-bromosuccinimide and thereafter with anhydrous sulfur dioxide yielded 2α-methyl-17β-(β-cyclopentylpropionyloxy)-4,9(11)-androstadien-3-one.

(e) 2α-methyl-11β-hydroxy-17β-(2-furoyloxy)-4-androsten-3-one with N-bromosuccinimide and thereafter with anhydrous sulfur dioxide yielded 2α-methyl-17β-(2-furoyloxy)-4,9(11)-androstadien-3-one.

(f) 2α-ethyl-11β-hydroxy-17β-propionyloxy-4-androsten-3-one with N-bromosuccinimide and thereafter with anhydrous sulfur dioxide yielded 2α-ethyl-17β-propionyloxy-4,9(11)-androstadien-3-one.

(g) 2α-propyl-11β-hydroxy-17β-hexanoyloxy-4-androsten-3-one with N-bromosuccinimide and thereafter with anhydrous sulfur dioxide yielded 2α-propyl-17β-hexanoyloxy-4,9(11)-androstadien-3-one.

(h) 2α-butyl-11β-hydroxy-17β-toluyloxy-4-androsten-3-one with N-bromosuccinimide and thereafter with anhydrous sulfur dioxide yielded 2α-butyl-17β-toluyloxy-4,9(11)-androstadien-3-one.

(i) 2α-hexyl-11β-hydroxy-17β-phenylacetoxy-4-androsten-3-one with N-bromosuccinimide and thereafter with anhydrous sulfur dioxide yielded 2α-hexyl-17β-phenylacetoxy-4,9(11)-androstadien-3-one.

(j) 2α-octyl-11β-hydroxy-17β-phenylpropionyloxy-4-androsten-3-one with N-bromosuccinimide and thereafter with anhydrous sulfur dioxide yielded 2α-octyl-17β-phenylpropionyloxy-4,9(11)-androstadien-3-one.

(k) 2α-benzyl-11β-hydroxy-17β-octanoyloxy-4-androsten-3-one with N-bromosuccinimide and thereafter with anhydrous sulfur dioxide yielded 2α-benzyl-17β-octanoyloxy-4,9(11)-androstadien-3-one.

EXAMPLE 7

2α-Methyl-9α-Bromo-11β-Hydroxy-17β-Acetoxy-4-Androsten-3-One

The 2α-methyl-17β-acetoxy-4,9(11)-androstadiene-3-one produced in Example 4, was dissolved in fifteen milliliters of methylene chloride and 25 milliliters of tertiary butyl alcohol. To this solution was added a solution of 1.25 milliliters of seventy percent perchloric acid in 8.5 milliliters of water and thereto was added 0.2 gram of N-bromoacetamide, dissolved in five milliliters of tertiary butyl alcohol. After stirring the reaction mixture for a period of fifteen minutes at room temperature (22 to 25 degrees centigrade), 0.25 gram of sodium sulfite in twelve milliliters of water was added. The reaction mixture was thereupon concentrated to about six milliliters of volume and thereto was added five milliliters of water. The thus produced precipitate was collected on filter paper and recrystallized to yield 2α-methyl-9α-bromo-11β-hydroxy-17β-acetoxy-4-androsten-3-one.

EXAMPLE 8

2α-Ethyl-9α-Chloro-11β-Hydroxy-17β-Acetoxy-4-Androsten-3-One

In the same manner as shown in Example 7, 2α-ethyl-17β-acetoxy-4,9(11)-androstadien-3-one was treated in tertiary butyl alcohol and methylene chloride with a solution of N-chloroacetamide, dissolved in tertiary butyl alcohol in the present of aqueous perchloric acid to give 2α-ethyl-9α-chloro-11β-hydroxy-17β-acetoxy-4-androsten-3-one.

EXAMPLE 9

In the same manner as given in Example 7 reacting:

(a) 2α-methyl-17β-propionyloxy-4,9(11)-androstadien-3-one with N-bromoacetamide and perchloric acid in solution yielded 2α-methyl-9α-bromo-11β-hydroxy-17β-propionyloxy-4-androsten-3one.

(b) 2α-methyl-17β-butyryloxy-4,9(11)-androstadien-3-one with N-iodosuccinimide and perchloric acid in solution yielded 2α-methyl-9α-iodo-11β-hydroxy-17β-butyryloxy-4-androsten-3-one.

(c) 2α-methyl-17β-valeryloxy-4,9(11)-androstadien-3-one with N-chlorosuccinimide and perchloric acid in solution yielded 2α-methyl-9α-chloro-11β-hydroxy-17β-valeryloxy-4-androsten-3-one.

(d) 2α-methyl-17β-(β-cyclopentylpropionyloxy)-4,9(11)-androstadien-3-one with N-chloroacetamide and perchloric acid in solution yielded 2α-methyl-9α-chloro-11β-hydroxy-17β-(β-cyclopentylpropionyloxy)-4-androsten-3-one.

(e) 2α-methyl-17β-(2-furoyloxy)-4,9(11)-androstadien-3-one with N-bromoacetamide and perchloric acid in solution yielded 2α-methyl-9α-bromo-11β-hydroxy-17β-(2-furoyloxy)-4-androsten-3-one.

(f) 2α-ethyl-17β-propionyloxy-4,9(11)-androstadien-3-one with N-bromoacetamide and perchloric acid in solution yielded 2α-ethyl-9α-bromo-11β-hydroxy-17β-propionyloxy-4-androsten-3-one.

(g) 2α-propyl-17β-hexanoyloxy-4,9(11)-androstadien-3-one with N-bromoacetamide and perchloric acid in solution yielded 2α-propyl-9α-bromo-11β-hydroxy-17β-hexanoyloxy-4-androsten-3-one.

(h) 2α-butyl-17β-toluyloxy-4,9(11)-androstadien-3-one with N-bromoacetamide and perchloric acid in solution yielded 2α-butyl-9α-bromo-11β-hydroxy-17β-toluyloxy-4-androsten-3-one.

(i) 2α-hexyl-17β-phenylacetoxy-4,9(11)-androstadien-3-one with N-bromoacetamide and perchloric acid in solution yielded 2α-hexyl-9α-bromo-11β-hydroxy-17β-phenylacetoxy-4-androsten-3-one.

(j) 2α-octyl-17β-phenylpropionyloxy-4,9(11)-androstadien-3-one with N-bromoacetamide and perchloric acid in solution yielded 2α-octyl-9α-bromo-11β-hydroxy-17β-phenylpropionyloxy-4-androsten-3-one.

(k) 2α-benzyl-17β-octanoyloxy-4,9(11)-androstadien-3-one with N-bromoacetamide and perchloric acid in solution yielded 2α-benzyl-9α-bromo-11β-hydroxy-17β-octanoyloxy-4-androsten-3-one.

In the same manner as given in Examples 7, 8 and 9, other 2α-lower-alkyl-9α-halo-11β-hydroxy-17β-acyloxy-4-androsten-3-ones are prepared by reacting the corresponding 2α-lower-alkyl-17β-acyloxy-4,9(11)-androstadien-3-one with a N-haloacylamide in aqueous acidified solution. In this manner lower-alkyl-9α-halo-11β-hydroxy-17β-acyloxy-4-androsten-3-ones are prepared wherein the 2α-lower-alkyl-group is methyl, ethyl, propyl, isopropyl, butyl, isobutyl, pentyl, hexyl, heptyl, octyl, benzyl or phenyl, wherein the halo is bromo, chloro, and iodo, with bromo preferred, and wherein the acyloxy group is of an organic carboxylic acid, preferably of a hydrocarbon carboxylic acid containing from one to eight carbon atoms, illustratively acyloxy groups as described in Example 3.

EXAMPLE 10

2α-Methyl-9α-Bromo-11β,17β-Dihydroxy-4-Androsten-3-One

A solution was prepared containing one gram of 2α-methyl-9α-bromo-11β-hydroxy-17β-acetoxy-4-androsten-3-one in fifty milliliters of methanol. To this solution was added one milliliter of sulfuric acid dissolved in five milliliters of water. The thus obtained mixture was allowed to stand for a period of 48 hours and thereupon poured into 100 milliliters of ice water. The reaction mixture was then extracted with three 25-milliliter portions of methylene chloride, the methylene chloride solution was dried, evaporated and the residue recrystallized from Skellysolve B hexane and acetone to give 2α-methyl-9α-bromo-11β,17β-dihydroxy-4-androsten-3-one.

EXAMPLE 11

2α-Ethyl-9α-Chloro-11β,17β-Dihydroxy-4-Androsten-3-One

In the same manner as shown in Example 10, 2α-ethyl-9α-chloro-11β-hydroxy-17β-acetoxy-4-androsten-3-one was hydrolyzed in an acid medium using tertiary butyl alcohol as solvent and dilute aqueous sulfuric acid as the acid catalyst to give 2α-ethyl-9α-chloro-11β,17β-dihydroxy-4-androsten-3-one.

EXAMPLE 12

*2α-Methyl-9β,11β-Oxido-17β-Acetoxy-4-Androsten-3-One*

The 2α-methyl-9α-bromo-11β-hydroxy-17β-acetoxy-4-androsten-3-one obtained in Example 9, dissolved in fifteen milliliters of acetone, was refluxed with 0.5 gram of potassium acetate for a period of sixteen hours. The reaction mixture was then concentrated to one-half of the volume and diluted with excess water. The thus produced precipitate was collected on filter, recrystallized from acetone Skellysolve B hexanes to give 2α-methyl-9β,11β-oxido-17β-acetoxy-4-androsten-3-one.

EXAMPLE 13

*2α-Ethyl-9β,11β-Oxido-17β-Acetoxy-4-Androsten-3-One*

In the same manner as shown in Example 12, refluxing 2α-ethyl-9α-chloro-11β-hydroxy-17β-acetoxy-4-androsten-3-one with potassium acetate for a period of 24 hours produced 2α-ethyl-9β,11β-oxido-17β-acetoxy-4-androsten-3-one.

EXAMPLE 14

*2α-Methyl-9β,11β-Oxido-17β-Hydroxy-4-Androsten-3-One*

In the same manner as shown in Example 12, refluxing 2α-methyl-9α-bromo-11β,17β-dihydroxy-4-androsten-3-one with potassium acetate in dioxane solution for a period of 24 hours produces 2α-methyl-9β,11β-oxido-17β-hydroxy-4-androsten-3-one.

EXAMPLE 15

In the same manner as given in Example 12, refluxing in acetone solution with anhydrous potassium acetate:

(a) 2α-methyl-9α-bromo-11β-hydroxy-17β-propionyloxy-4-androsten-3-one yielded 2α-methyl-9β,11β-oxido-17β-propionyloxy-4-androsten-3-one.

(b) 2α-methyl-9α-iodo-11β-hydroxy-17β-butyryloxy-4-androsten-3-one yielded 2α-methyl-9β,11β-oxido-17β-butyryloxy-4-androsten-3-one.

(c) 2α-methyl-9α-chloro-11β-hydroxy-17β-valeryloxy-4-androsten-3-one yielded 2α-methyl-9β,11β-oxido-17β-valeryloxy-4-androsten-3-one.

(d) 2α-methyl-9α-chloro-11β-hydroxy-17β-(β-cyclopentylpropionloxy)-4-androsten-3-one yielded 2α-methyl-9β,11β-oxido-17β-(β-cyclopentylpropionyloxy)-4-androsten-3-one.

(e) 2α-methyl-9α-bromo-11β-hydroxy-17β-(2-furoyloxy)-4-androsten-3-one yielded 2α-methyl-9β,11β-oxido-17β-(2-furoyloxy)-4-androsten-3-one.

(f) 2α-ethyl-9α-bromo-11β-hydroxy-17β-propionyloxy-4-androsten-3-one yielded 2α-ethyl-9β,11β-oxido-17β-propionyloxy-4-androsten-3-one.

(g) 2α-propyl-9α-bromo-11β-hydroxy-17β-hexanoyloxy-4-androsten-3-one yielded 2α-propyl-9β,11β-oxido-17β-hexanoyloxy-4-androsten-3-one.

(h) 2α-butyl-9α-bromo-11β-hydroxy-17β-toluyloxy-4-androsten-3-one yielded 2α-butyl-9β,11β-oxido-17β-toluyloxy-4-androsten-3-one.

(i) 2α-hexyl-9α-bromo-11β-hydroxy-17β-phenylacetoxy-4-androsten-3-one yielded 2α-hexyl-9β,11β-oxido-17β-phenylacetoxy-4-androsten-3-one.

(j) 2α-octyl-9α-bromo-11β-hydroxy-17β-phenylpropionyloxy-4-androsten-3-one yielded 2α-octyl-9β,11β-oxido-17β-phenylpropionyloxy-4-androsten-3-one.

(k) 2α-benzyl-9α-bromo-11β-hydroxy-17β-octanoyloxy-4-androsten-3-one yielded 2α-benzyl-9β,11β-oxido-17β-octanoyloxy-4-androsten-3-one.

In the same manner as shown in Examples 12 through 15, other 2α-lower-alkyl-9β,11β-oxido-17β-acyloxy-4-androsten-3-ones are prepared by heating the corresponding 2α-lower-alkyl-9α-halo-11β-hydroxy-17β-acyloxy-4-androsten-3-ones with anhydrous sodium or potassium acetate in acetone solution. 2α-lower-alkyl-9β,11β-oxido-17β-acyloxy-4-androsten-3-one thus produced include those wherein the lower-alkyl group is methyl, ethyl, propyl, isopropyl, butyl, isobutyl, pentyl, hexyl, heptyl, octyl, phenyl, and benzyl, or the like, and wherein the acyloxy group is as described and defined in Example 3.

EXAMPLE 16

*2α-Methyl-9α-Fluoro-11β-Hydroxy-17β-Acetoxy-4-Androsten-3-One*

The 2α-methyl-9β,11β-oxido-17β-acetoxy-4-androsten-3-one of Example 12, was dissolved in 25 milliliters of methylene chloride and stirred vigorously for a period of twenty hours with one milliliter of 48 percent aqueous hydrofluoric acid. The mixture was poured onto an excess of saturated sodium bicarbonate and the methylene chloride layer was separated. The methylene chloride layer was thereupon dried over anhydrous sodium sulfate and chromatographed over fifty grams of Florisil. Elution with five percent and ten percent acetone Skellysolve B hexane solution gave 2α-methyl-9α-fluoro-11β-hydroxy-17β-acetoxy-4-androsten-3-one.

EXAMPLE 17

*2α-Ethyl-9α-Fluoro-11β-Hydroxy-17β-Acetoxy-4-Androsten-3-One*

In the manner shown in Example 16, 2α-ethyl-9β,11β-oxido-17β-acetoxy-4-androsten-3-one was treated with aqueous hydrofluoric acid in the presence of perchloric acid. The mixture was neutralized and extracted to give 2α-ethyl-9α-fluoro-11β-hydroxy-17β-acetoxy-4-androsten-3-one.

EXAMPLE 18

In the same manner as given in Example 16, treating in methylene chloride at room temperature, twenty to thirty degrees centigrade, with 48 percent aqueous hydrofluoric acid;

(a) 2α-methyl-9β,11β-oxido-17β-propionyloxy-4-androsten-3-one yielded 2α-methyl-9α-fluoro-11β-hydroxy-17β-propionyloxy-4-androsten-3-one.

(b) 2α-methyl-9β,11β-oxido-17β-butyryloxy-4-androsten-3-one yielded 2α-methyl-9α-fluoro-11β-hydroxy-17β-butyryloxy-4-androsten-3-one.

(c) 2α-methyl-9β,11β-oxido-17β-valeryloxy-4-androsten-3-one yielded 2α-methyl-9α-fluoro-11β-hydroxy-17β-valeryloxy-4-androsten-3-one.

(d) 2α-methyl-9β,11β-oxido-17β-(β-cyclopentylpropionyloxy)-4-androsten-3-one yielded 2α-methyl-9α-fluoro-11β-hydroxy-17β-(β-cyclopentylpropionyloxy)-4-androsten-3-one.

(e) 2α-methyl-9β,11β-oxido-17β-(2-furoyloxy)-4-androsten-3-one yielded 2α-methyl-9α-fluoro-11β-hydroxy-17β-(2-furoyloxy)-4-androsten-3-one.

(f) 2α-ethyl-9β,11β-oxido-17β-propionyloxy-4-androsten-3-one yielded 2α-ethyl-9α-fluoro-11β-hydroxy-17β-propionyloxy-4-androsten-3-one.

(g) 2α-propyl-9β,11β-oxido-17β-hexanoyloxy-4-androsten-3-one yielded 2α-propyl-9α-fluoro-11β-hydroxy-17β-hexanoyloxy-4-androsten-3-one.

(h) 2α-butyl-9β,11β-oxido-17β-toluyloxy-4-androsten-3-one yielded 2α-butyl-9α-fluoro-11β-hydroxy-17β-toluyloxy-4-androsten-3-one.

(i) 2α-hexyl-9β,11β-oxido-17β-phenylacetoxy-4-androsten-3-one yielded 2α-hexyl-9α-fluoro-11β-hydroxy-17β-phenylacetoxy-4-androsten-3-one.

(j) 2α-octyl-9β,11β-oxido-17β-phenylpropionyloxy-4-androsten-3-one yielded 2α-octyl-9α-fluoro-11β-hydroxy-17β-phenylpropionyloxy-4-androsten-3-one.

(k) 2α-benzyl-9β,11β-oxido-17β-octanoyloxy-4-androsten-3-one yielded 2α-benzyl-9α-fluoro-11β-hydroxy-17β-octanoyloxy-4-androsten-3-one.

In the same manner as given in Examples 16 through 18, other 2α-lower-alkyl-9α-fluoro-11β-hydroxy-17β-acyloxy-4-androsten-3-ones are prepared by reacting the corresponding 2α-lower-alkyl-9β,11β-oxido-17β-acyloxy-4-androsten-3-one with hydrofluoric acid. The thus obtained 2α-methyl-9α-fluoro-11β-hydroxy-17β-acyloxy-4- androsten-3-ones comprise those wherein the lower-alkyl group is methyl, ethyl, propyl, butyl, isopropyl, pentyl, hexyl, heptyl, octyl, phenyl and benzyl, or the like, and wherein the acyloxy group is described and defined as in Example 3.

EXAMPLE 19

*2α-Methyl-9α-Fluoro-11β,17β-Dihydroxy-4-Androsten-3-One*

One-half gram of 2α-methyl-9α-fluoro-11β-hydroxy-17β-acetoxy-4-androsten-3-one was refluxed with 0.25 gram of potassium carbonate, dissolved in 25 milliliters of methanol. The mixture after one hour of refluxing was poured into 100 milliliters of ice water and the thus obtained reaction mixture was extracted with methylene chloride. The methylene chloride layers were evaporated after drying over anhydrous sodium carbonate and the resulting residue was recrystallized from acetone Skellysolve B hexanes to give pure 2α-methyl-9α-fluoro-11β,17β-dihydroxy-4-androsten-3-one.

EXAMPLE 20

*2α-Ethyl-9α-Fluoro-11β,17β-Dihydroxy-4-Androsten-3-One*

In the same manner given in Example 19, hydrolyzing 2α-ethyl-9α-fluoro-11β-hydroxy-17β-acetoxy-4-androsten-3-one with potassium carbonate in ethanol produced 2α-ethyl-9α-fluoro-11β,17β-dihydroxy-4-androsten-3-one.

EXAMPLE 21

In the same manenr as given in Example 19, hydrolyzing with potassium carbonate in methanol or ethanol solution:

(a) 2α-propyl-9α-fluoro-11β-hydroxy-17β-hexanoyloxy-4-androsten-3-one gave 2α-propyl-11β,17β-dihydroxy-4-androsten-3-one.

(b) 2α-butyl-9α-fluoro-11β-hydroxy-17β-toluyloxy-4-androsten-3-one gave 2α-butyl-9α-fluoro-11β,17β-dihydroxy-4-androsten-3-one.

(c) 2α-hexyl-9α-fluoro-11β-hydroxy-17β-phenylacetoxy-4-androsten-3-one gave 2α-hexyl-9α-fluoro-11β,17β-dihydroxy-4-androsten-3-tone.

(d) 2α-octyl-9α-fluoro-11β-hydroxy-17β-phenylpropionyloxy-4-androsten-3-one gave 2α-octyl-9α-fluoro-11β,17β-dihydroxy-4-androsten-3-one.

(e) 2α-benzyl-9α-fluoro-11β-hydroxy-17β-octanoyloxy-4-androsten-3-one gave 2α-benzyl-9α-fluoro-11β,17β-dihydroxy-4-androsten-3-one.

EXAMPLE 22

*2α-Methyl-9α-Bromo-17β-Acetoxy-4-Androstene-3,11-Dione*

One gram of 2α-methyl-9α-bromo-11β-hydroxy-17β-acetoxy-4-androsten-3-one, prepared as in Example 7, dissolved in twenty milliliters of acetic acid and one milliliter of water, was treated with one half gram of sodium dichromate dihydrate at room temperature for a period of two hours. Thereafter the reaction mixture was poured into 100 milliliters of water and neutralized by the addition of dilute sodium hydroxide. The mixture was thereupon extracted with methylene chloride, the methylene chloride extract was dried and evaporated and the thus resulting residue was recrystallized from ethyl acetate to give 2α-methyl-9α-bromo-17β-acetoxy-4-androsten-3,11-dione.

The thus obtained 2α-methyl-9α-bromo-17β-acetoxy-4-androsten-3,11-dione was hydrolyzed as shown in Example 19 in methanol with potassium carbonate to give 2α-methyl-9α-bromo-17β-hydroxy-4-androstene-3,11-dione.

EXAMPLE 23

*2α-Methyl-9α-Bromo-4-Androstene-3,11,17-Trione*

In the same manner as shown in Example 22, oxidizing 2α-methyl-9α-bromo-17β-hydroxy-4-androstene-3,11-dione of Example 22, with chromic anhydride in acetic acid solution results in 2α-methyl-9α-bromo-4-androstene-3,11,17-trione (2α-methyl-9α-bromoadrenosterone).

Oxidizing 2α-lower-alkyl-9α-halo-11β-hydroxy-17β-acyloxy steroids with chromic acid in acetic acid wherein the alkyl group is methyl, ethyl, propyl, butyl, isobutyl, pentyl, hexyl, heptyl, octyl, or the like, and wherein halo is selected from chloro, bromo, and iodo and acyloxy is defined and described as before in Example 3, the corresponding 2α-lower-alkyl-9α-halo-17β-acyloxy-4-androstene-3,11-diones are obtained. Hydrolysis of such 2α-lower-alkyl-9α-halo-17β-acyloxy-4-androstene-3,11-diones give the corresponding 2α-lower-alkyl-9α-halo-17β-hydroxy-4-androstene-3,11-diones which are oxidizable in acetic acid with chromic anhydride to the corresponding 2-lower-alkyl-9α-haloadrenosterones (2α-lower-alkyl-9α-halo-4-androstene-3,11,17-triones).

EXAMPLE 24

*2α-Methyl-9α-Fluoro-17β-Acetoxy-4-Androstene-3,11-Dione*

In the same manner as shown in Example 22, oxidation of 2α-methyl-9α-fluoro-11β-hydroxy-17β-acetoxy-4-androsten-3-one with sodium dichromate in acetic acid solution produced 2α-methyl-9α-fluoro-17β-acetoxy-4-androstene-3,11-dione.

Hydrolysis of 2α-methyl-9α-fluoro-17β-acetoxy-4-androstene-3,11-dione with potassium carbonate in ethanol solution as described in Example 19, produced the corresponding 2α-methyl-9α-fluoro-17β-hydroxy-4-androstene-3,11-dione.

EXAMPLE 25

*2α-Methyl-9α-Fluoro-4-Androstene-3,11,17-Trione*

In the manner shown in Example 22, oxidizing 2α-methyl-9α-fluoro-17β-hydroxy-4-androstene-3,11-dione with chromic anhydride in acetic acid in the presence of water produced 2α-methyl-9α-fluoro-4-androstene-3,11,17-trione (2α-methyl-9α-fluoroadrenosterone).

In the same manner as given in Example 25 oxidizing 2α-lower-alkyl-9α-fluoro-11β,17β-dihydroxy-4-androsten-3-ones produces the corresponding 2α-lower-alkyl-9α-fluoroadrenosterones wherein the alkyl group may be methyl, ethyl, propyl, isopropyl, butyl, isobutyl, pentyl, hexyl, heptyl, octyl, phenyl, benzyl, or the like.

We claim:

1. 2α-methyl-9α-fluoro-17β-acetoxy-4-androstene-3,11-dione.

2. 2α-methyl-9α-fluoro-4-androstene-3,11,17-trione.

3. A process for the production of a 2α-lower-alkyl-9α-fluoro-4-androsten-3,11,17-trione which comprises the steps: reducing a 2α-lower-alkyl-11β-hydroxy-4-androstene-3,17-dione wherein the lower-alkyl radical contains from one to eight carbon atoms, inclusive, with an alkali borohydride to reduce the 17-keto group and oxidizing the resulting mixture with manganese dioxide to obtain 2α-lower-alkyl-11β,17β-dihydroxy-4-androsten-3-one; esterifying the thus obtained 2α-lower-alkyl-11β,17β-dihydroxy-4-androsten-3-one with an acylating agent selected from halides and anhydrides of organic carboxylic acids containing from one to eight carbon atoms, inclusive, to obtain the corresponding 2α-lower-alkyl-11β-hydroxy-17α-acyloxy-4-androsten-3-one; treating the thus produced 2α-lower-alkyl-11β-hydroxy-17α-acyloxy-4-androsten-3-one with an N-halo-acylamide wherein the halogen is of atomic weight 34 to 130, inclusive, in an organic base under anhydrous conditions and treating the thus produced intermediate, 11β-hypohalite, with sulfur dioxide under anhydrous conditions to obtain the corresponding 2α-lower-alkyl-17β-acyloxy-4,9(11)-androstadien-3-one; treating the thus produced 2α-lower-alkyl-17β-acyloxy-4,9(11)-androstadien-3-one with a hypohalous acid wherein the halogen is of atomic weight from 33 to 130, inclusive, to obtain the corresponding 2α-lower-alkyl-9α-halo-11β-hydroxy-17β-acyloxy-4-androsten-3-one; treating the thus obtained 2α-lower-alkyl-9α-halo-11β-hydroxy-17β-acyloxy-4-androsten-3-one in acetone solution with an alkali-metal acetate to obtain the corresponding 2α-lower-alkyl-9β,11β-oxido-17β-acyloxy-4-androsten-3-one; treating the thus obtained 2α-lower-alkyl-9-11-oxido-17β-acyloxy-4-androsten-3-one with hydrogen fluoride to obtain the corresponding 2α-lower-alkyl-9α-fluoro-11β-hydroxy-17β-acyloxy-4-androsten-3-one, oxidizing the thus produced 2α-lower-alkyl-9α-fluoro-11-β-hydroxy-17β-acyloxy-4-androsten-3-one with chromic acid to obtain the corresponding 2α-lower-alkyl-9α-fluoro-17β-acyloxy-4-androstene-3,11-dione; hydrolyzing the thus obtained 2α-lower-alkyl-9α-fluoro-17β-acyloxy-4-androstene-3,11-dione with base to give 2α-lower-alkyl-9α-fluoro-17β-hydroxy-4-androstene-3,11-dione and oxidizing the thus obtainer 2α-lower-alkyl-9α-fluoro-17β-hydroxy-4-androstene-3,11-dione with chromic acid to obtain 2α-lower-alkyl-9α-fluoro-4-androstene-3,11,17-trione.

4. A process for the production of 2α-methyl-9α-fluoro-4-androstene-3,11,17-trione which comprises: reducing 2α-methyl-11β-hydroxy-4-androstene-3,17-dione with an alkali-metal borohydride and oxidizing the resulting mixture with manganese dioxide to obtain 2α-methyl-11β,17β-dihydroxy-4-androsten-3-one; acylating the thus obtained 2α-methyl-11β,17β-dihydroxy-4-androsten-3-one with acetic anhydride to obtain 2α-methyl-11β-hydroxy-17β-acetoxy-4-androsten-3-one; treating the thus produced 2α-methyl-11β-hydroxy-17β-acetoxy-4-androsten-3-one with N-bromoacetamide under anhydrous conditions in an organic base to obtain the corresponding 11-hypohalite and treating the thus obtained 11-hypohalite with anhydrous sulfur dioxide to obtain 2α-methyl-17β-acetoxy-4,9(11)-androstadien-3-one; treating the thus produced 2α-methyl-17β-acetoxy-4,9(11)-androstadien-3-one with N-bromoacetamide and an aqueous mineral acid to give 2α-methyl-9α-bromo-11β-hydroxy-17β-acetoxy-4-androsten-3-one; heating the thus produced 2α-methyl-9α-bromo-11β-hydroxy-17β-acetoxy-4-androsten-3-one with anhydrous alkali metal acetate to obtain 2α-methyl-9β,11β-oxido-17β-acetoxy-4-androsten-3-one; treating the thus obtained 2α-methyl-9β,11β-oxido-17β-acetoxy-4-androsten-3-one with hydrogen fluoride to give 2α-methyl-9α-fluoro-11β-hydroxy-17β-acetoxy-4-androsten-3-one; oxidizing the thus produced 2α-methyl-9α-fluoro-11β-hydroxy-17β-acetoxy-4-androsten-3-one with chromic acid to obtain 2α-methyl-9α-fluoro-17β-acetoxy-4-androstene-3,11-dione; and hydrolyzing the thus produced 2α-methyl-9α-fluoro-17β-acetoxy-4-androstene-3,11-dione with an alkali metal carbonate to obtain 2α-lower-alkyl-9α-fluoro-17β-hydroxy-4-androstene-3,11-dione and oxidizing the thus obtained 2α-methyl-9α-fluoro-17β-hydroxy-4-androstene-3,11-dione with chromic acid to obtain 2α-methyl-9α-fluoro-4-androstene-3,11,17-trione.

5. A compound selected from the group consisting of 2α-lower-alkyl-9α-halo-17β-hydroxy-4-androstene-3,11-dione and 2α-lower-alkyl-9α-halo-17β-acyloxy-4-androstene-3,11-dione wherein the lower-alkyl radical contains from one to eight carbon atoms, inclusive, wherein the acyl group of the acyloxy radical is of a hydrocarbon carboxylic acid containing from one to eight carbon atoms, inclusive, and wherein the halo atom has an atomic weight from 17 to 130, inclusive.

6. 2α-lower-alkyl-9α-halo-4-androstene-3,11,17-trione wherein the lower alkyl radical contains from one to eight carbon atoms, inclusive, and wherein the halo atom has an atomic weight from 17 to 130, inclusive.

References Cited in the file of this patent
UNITED STATES PATENTS

| | | |
|---|---|---|
| 2,883,401 | Babcock et al. | Apr. 21, 1959 |
| 3,118,880 | Wettstein et al. | Jan. 21, 1964 |

OTHER REFERENCES

Fried et al.: Journal American Chem. Soc. (1957), page 1134.